(12) United States Patent
May

(10) Patent No.: US 10,059,604 B2
(45) Date of Patent: Aug. 28, 2018

(54) ROLL-UP WATER BOTTLE WITH CLOSURE/FILTER ASSEMBLY

(71) Applicants: QuenchWorks, LLC, Dallas, TX (US); Mary Ann May, Dallas, TX (US)

(72) Inventor: Myron R. May, Dallas, TX (US)

( * ) Notice: Subject to any disclaimer, the term of this patent is extended or adjusted under 35 U.S.C. 154(b) by 0 days.

(21) Appl. No.: 14/449,276

(22) Filed: Aug. 1, 2014

(65) Prior Publication Data

US 2016/0031720 A1 Feb. 4, 2016

(51) Int. Cl.

| | |
|---|---|
| *C02F 1/00* | (2006.01) |
| *B65D 1/02* | (2006.01) |
| *B65D 37/00* | (2006.01) |
| *A45F 3/20* | (2006.01) |
| *A45F 3/16* | (2006.01) |
| *C02F 1/28* | (2006.01) |

(52) U.S. Cl.
CPC .............. *C02F 1/003* (2013.01); *C02F 1/002* (2013.01); *A45F 3/20* (2013.01); *A45F 2003/163* (2013.01); *B65D 1/0292* (2013.01); *B65D 37/00* (2013.01); *C02F 1/283* (2013.01); *C02F 2201/009* (2013.01); *C02F 2307/02* (2013.01); *Y02A 20/212* (2018.01)

(58) Field of Classification Search
CPC ...... C02F 1/002; C02F 1/003; C02F 2307/02; C02F 1/283; C02F 2201/009; B01D 24/14; B01D 29/15; B01D 35/30; B65D 83/754; B65D 25/465; B65D 35/08; B65D 37/00; B65D 1/0292; A45F 2003/163; A45F 3/20; A45F 2003/205; A45F 3/16; A45F 2003/166

See application file for complete search history.

(56) References Cited

U.S. PATENT DOCUMENTS

| | | | | |
|---|---|---|---|---|
| 4,200,132 A | * | 4/1980 | Avery | B65D 33/16 383/90 |
| 4,775,513 A | * | 10/1988 | Marks | C02F 1/002 210/282 |
| 5,874,052 A | * | 2/1999 | Holland | B01D 46/12 422/122 |
| D687,319 S | * | 8/2013 | Panetta | D9/601 |
| 2005/0051476 A1 | * | 3/2005 | Chen | C02F 1/002 210/436 |
| 2007/0281058 A1 | * | 12/2007 | Fulcher | B65D 75/008 426/107 |

(Continued)

*Primary Examiner* — David C Mellon
*Assistant Examiner* — Liam Royce
(74) *Attorney, Agent, or Firm* — David H. Judson

(57) ABSTRACT

A roll-up water bottle comprises a hollow cylindrical opening adjacent one end thereof. The opening retains a removable closure/filter assembly. That assembly includes a filter retained within a bottle cap. The cap is positioned within a bottle opening support member retained within the hollow cylindrical opening. The filter housing is generally cylindrical but also includes an outer profile that includes a pair of opposed flat walls. When the filter is secured within the bottle cap and the cap secured within the bottle opening support member, a pair of water flow channels are created. Upon the user applying suction or pressure from squeezing the bottle, water contained with the bottle flows through vent openings in the filter, but also up through the water flow channels. The result is a more even distribution of fluid across a greater portion of the filter.

7 Claims, 24 Drawing Sheets

(56) References Cited

U.S. PATENT DOCUMENTS

| | | | | |
|---|---|---|---|---|
| 2008/0035553 A1* | 2/2008 | Brown | ................... | C02F 1/002 |
| | | | | 210/335 |
| 2008/0093295 A1* | 4/2008 | Heppenstall | ............ | C02F 1/686 |
| | | | | 210/610 |
| 2011/0278216 A1* | 11/2011 | Hull | ................... | A47G 19/2266 |
| | | | | 210/236 |

\* cited by examiner

ROLL-UP WATER BOTTLE WITH CLOSURE/FILTER ASSEMBLY

BACKGROUND

Technical Field

The subject matter herein relates generally to drinking containers, such as water bottles.

Background of the Related Art

A water bottle is a container, typically formed of plastic, to hold water or other beverages for consumption. It is designed for easy transport by an individual, and it may be disposable or reusable. Some water bottles include filtration systems or filter mechanisms to improve water quality, or to provide acceptable quality for the source liquid that may include water-borne contaminants or pathogens. Such filters may be supported in a removable straw-type arrangement for ease of cleaning and replacement. Typically, a filter of this type uses carbon material, such as activated charcoal, as the active filtering material. Representative bottles of this type are available commercially under the brands CAMEL-BAK® and BRITA® bottles, among others.

While filtration bottles of this type are useful, the filter system/mechanism typically extends throughout the length of the bottle housing. As a result, these types of container systems have to be used in large-size bottles, and they are not flexible enough to be adapted for use for containers that may have different use requirements, or wherein it is desired to provide for a filter in a bottle that may be rolled-up and stored.

BRIEF SUMMARY

A roll-up water or "sport" bottle comprises a container formed of a pair of opposed, matching plastic pieces. The pieces are sealed around the majority of their edges to form a substantially sealed container having a hollow cylindrical opening adjacent one end thereof. An opposed end forms a bottom. An outer edge portion of the bottle retains one or more pairs of opposed button-style fasteners, with each pair selectively positioned to mate with one another when the bottle is rolled-up. When the bottle is empty (or substantially empty), it may be rolled-up for transport and storage. The opposed button-style fasteners secure rolled-up portions of the container. The opening retains a removable closure/filter assembly. That assembly preferably includes a filter adapted to be removably-retained within a bottle cap of the closure. The bottle cap is positioned within a bottle opening support member retained within the hollow cylindrical opening of the roll-up bottle. Preferably, the filter housing is generally cylindrical but also includes an outer profile that includes a pair of opposed flat walls. When the filter is secured within the bottle cap and the cap secured within the bottle opening support member, a pair of water flow channels are created. Upon the user applying suction or pressure from squeezing the bottle, water contained with the bottle flows through vent openings in the filter, but also up through the water flow channels. The result is a more even distribution of fluid across a greater portion of the filter.

The foregoing has outlined some of the more pertinent features of the subject disclosure. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject disclosure and the advantages thereof, reference is now made to the following descriptions taken in conjunction with the accompanying drawings, in which.

DETAILED DESCRIPTION

Figure 1:
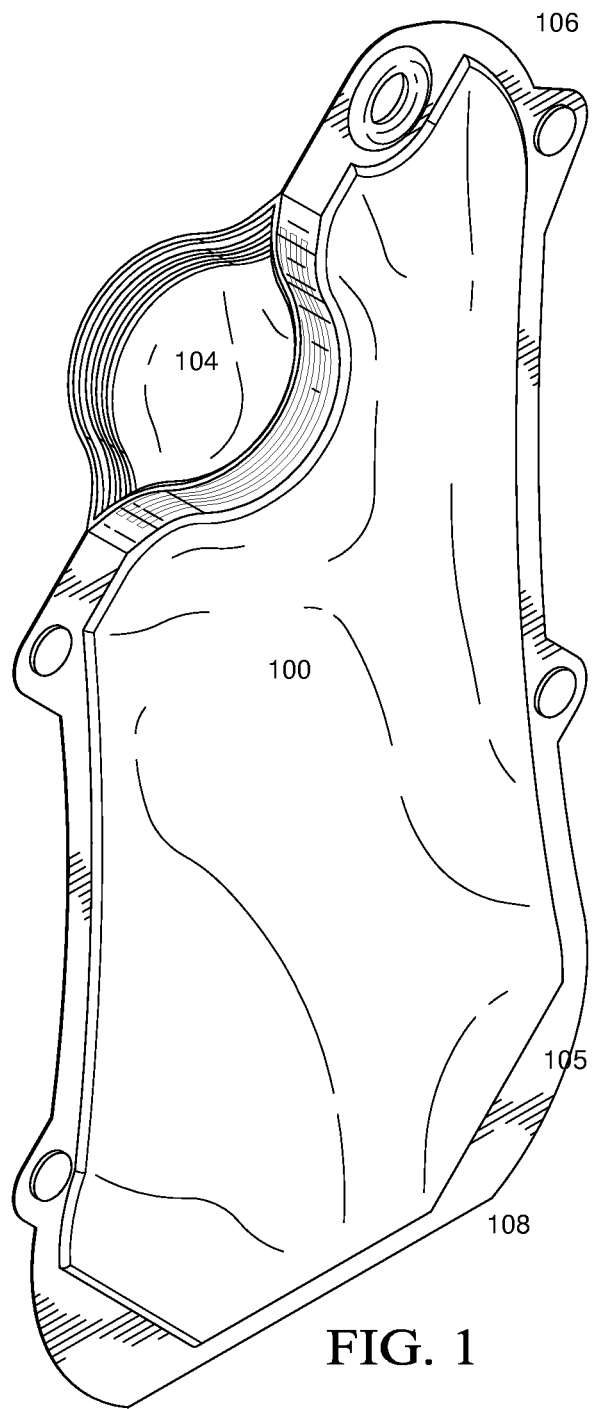
FIG. 1 is a perspective view of the roll-up bottle of this disclosure according to a first embodiment (an open configuration in which the bottle is adapted to be filled with a liquid, such as water)

FIG. 1 is a perspective view of the roll-up bottle 100 according to a first embodiment (an open configuration in which the bottle is adapted to be filled with a liquid, such as water). FIGS. 2-7 show the bottle 100 of FIG. 100 in various views.

Figure 8:
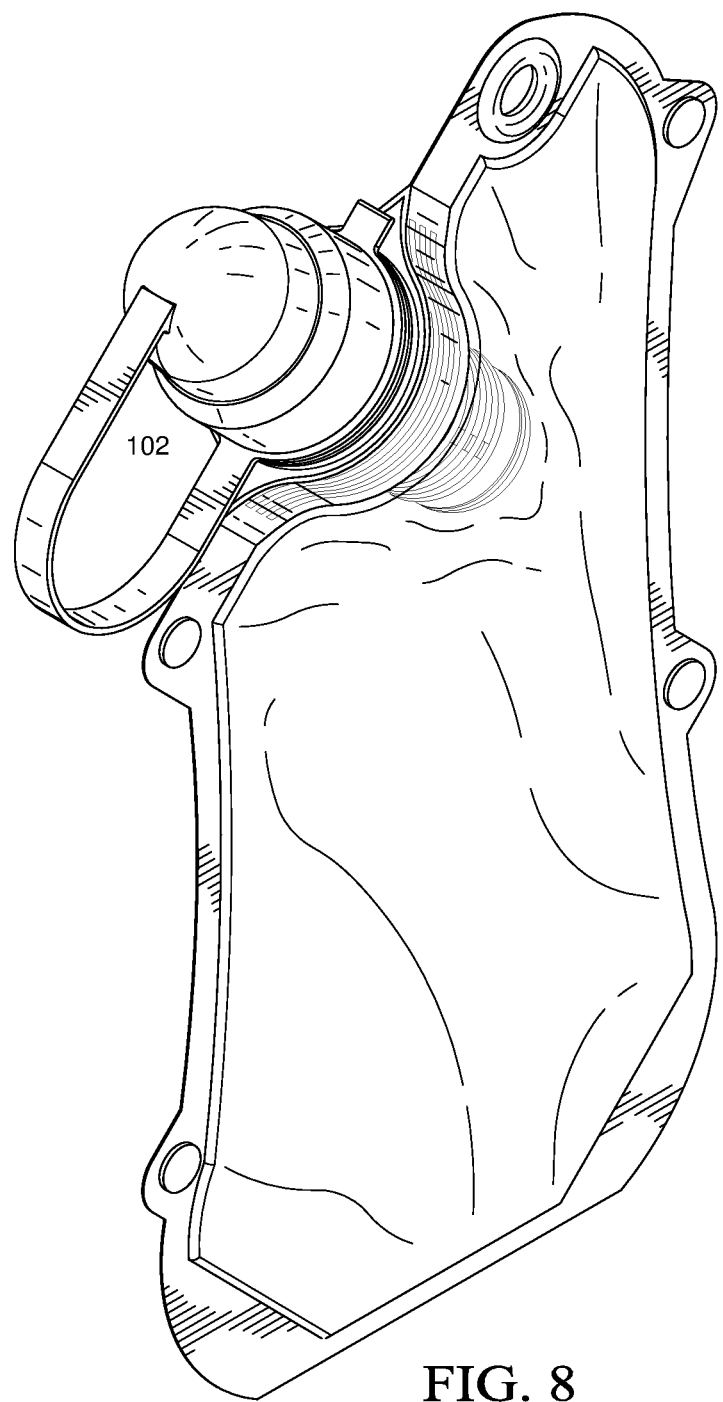
FIG. 8 is a perspective view of the roll-up bottle according to a second embodiment (having a closure/filter assembly)
Figure 9:
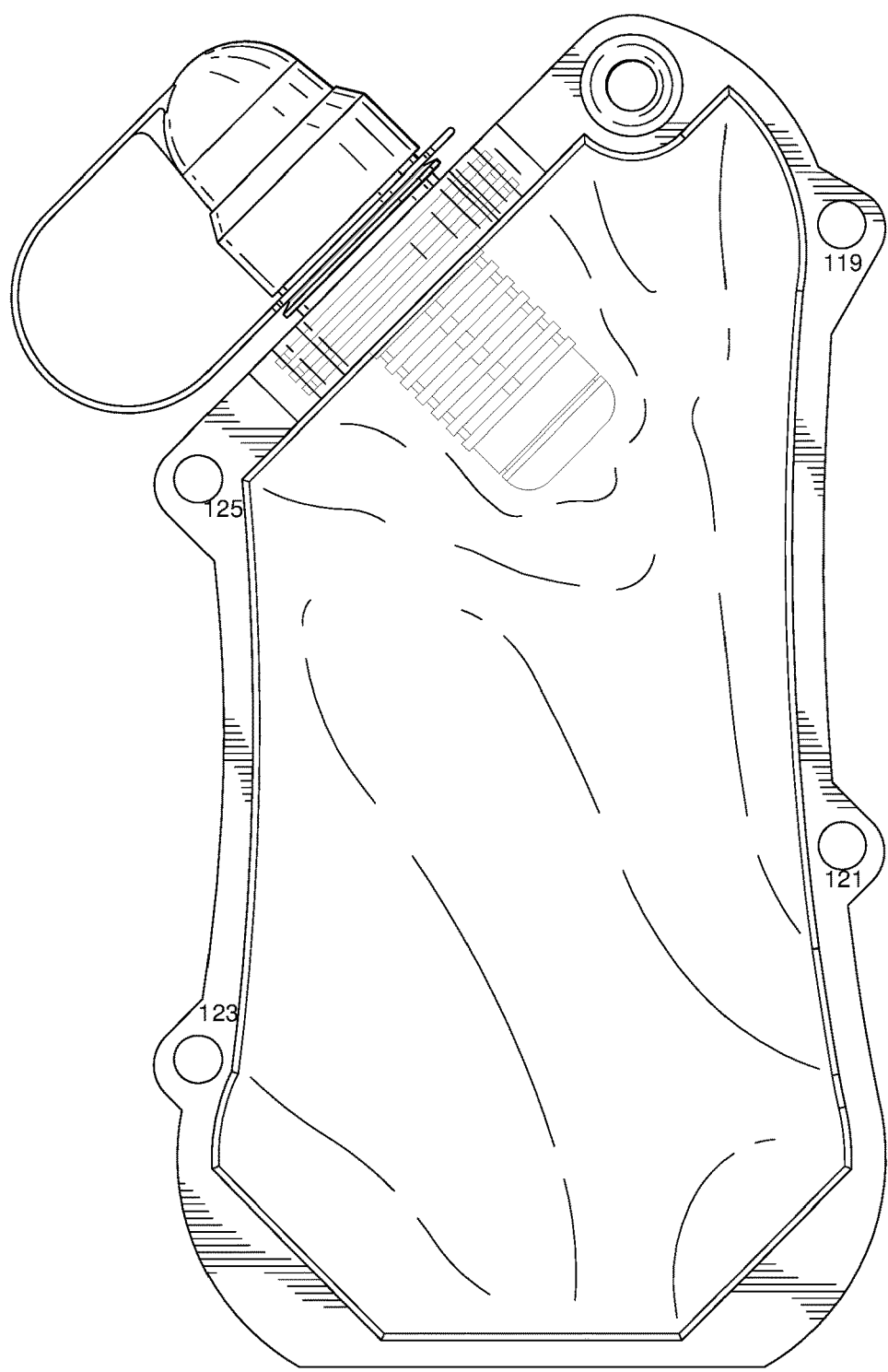
FIG. 9 is a front view of the roll-up bottle of FIG. 8.
Figure 10:
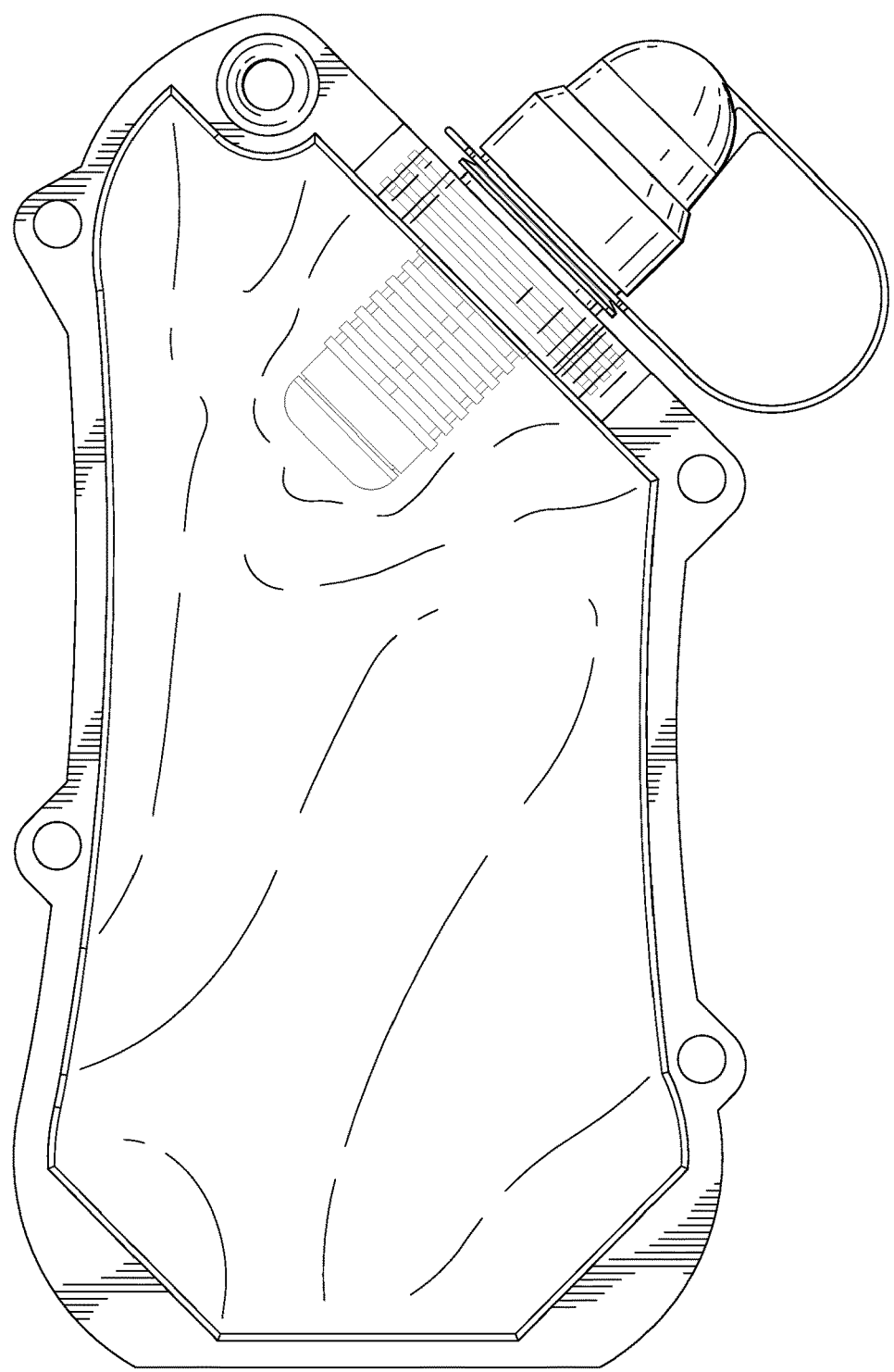
FIG. 10 is a back view of the roll-up bottle of FIG. 8.
Figure 11:
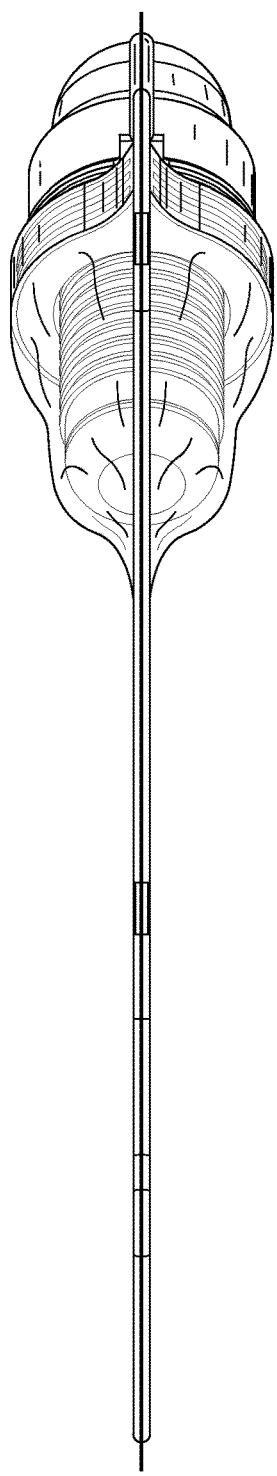
FIG. 11 is a right side view of the roll-up bottle of FIG. 8.
Figure 12:
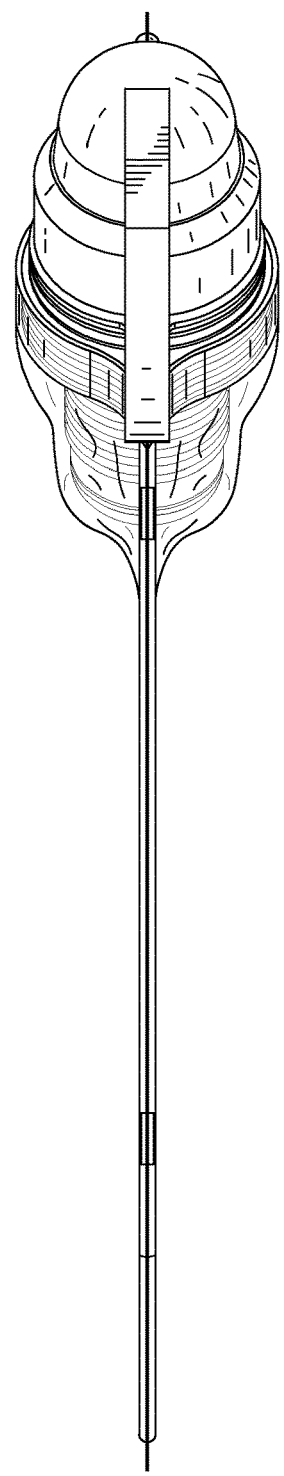
FIG. 12 is a left side view of the roll-up bottle of FIG. 8.
Figure 13:
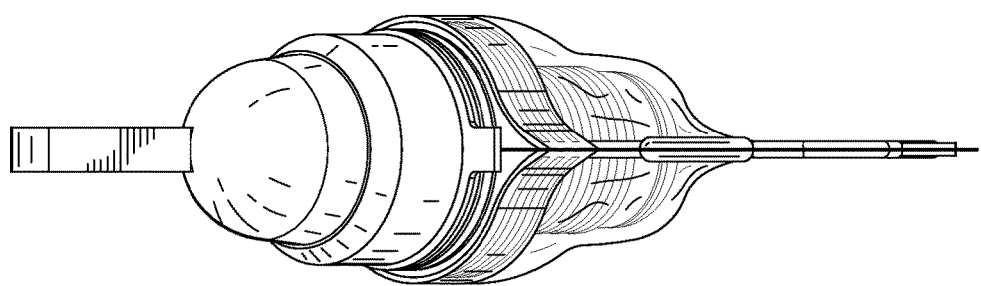
FIG. 13 is a top view of the roll-up bottle of FIG. 8.
Figure 14:
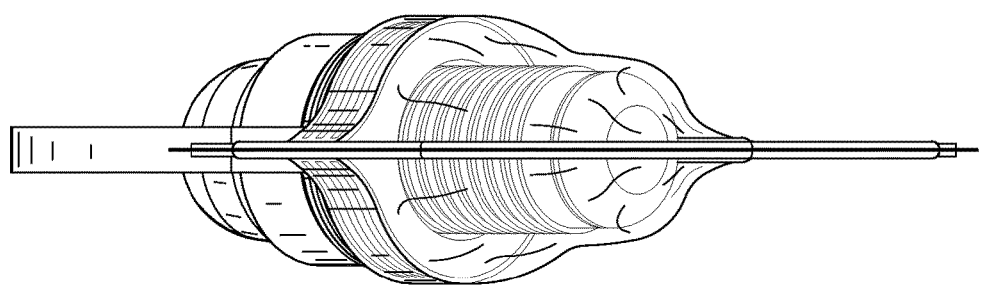
FIG. 14 is a bottom view of the roll-up bottle of FIG. 8.
Figure 15:
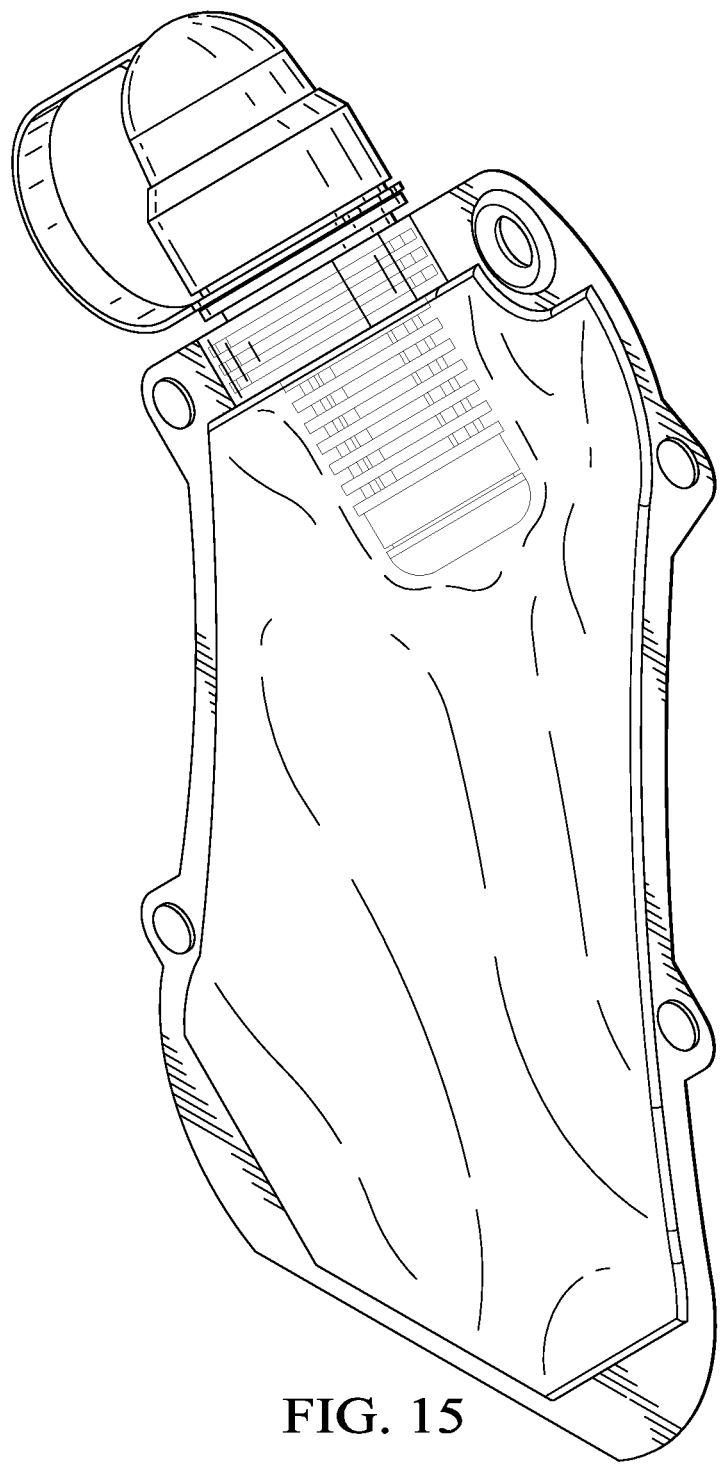
FIG. 15 is another perspective view of the roll-up bottle according to the second embodiment (having the closure/filter assembly)

FIG. 8 is a perspective view of the roll-up bottle 100 according to a second embodiment having a closure/filter assembly 102, as will be described. FIGS. 9-14 show the bottle of FIG. 8 in various views. FIG. 15 is another perspective view of the roll-up bottle according to the second embodiment having the closure/filter assembly.

Figure 16:
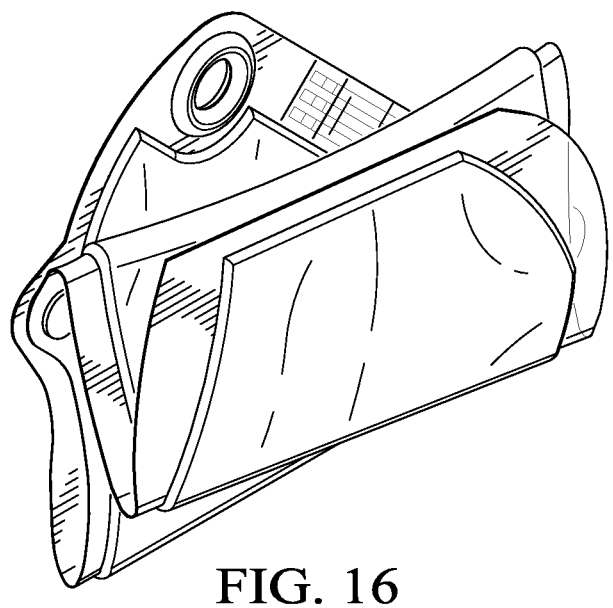
FIG. 16 is a perspective view of the roll-up bottle according to the first embodiment in a rolled-up configuration for transport and storage.

FIG. 16 is a perspective view of the roll-up bottle 100 (of FIG. 1) according to the first embodiment but in a full rolled-up configuration, e.g., for transport and storage. In this configuration, typically the roll-up bottle will be devoid or substantially devoid of liquid. FIGS. 17-22 show the bottle of FIG. 16 in various views.

Figure 23:
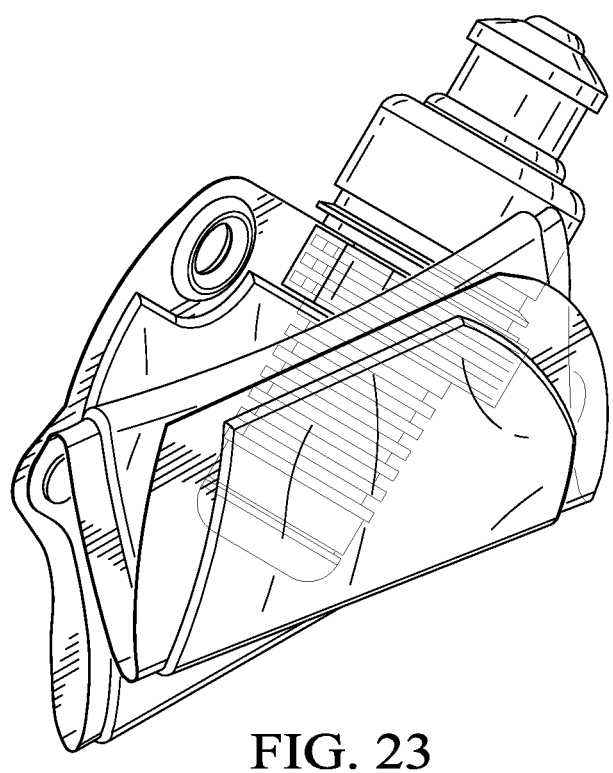
FIG. 23 is a perspective view of the roll-up bottle according to the second embodiment in a full rolled-up configuration.
Figure 24:
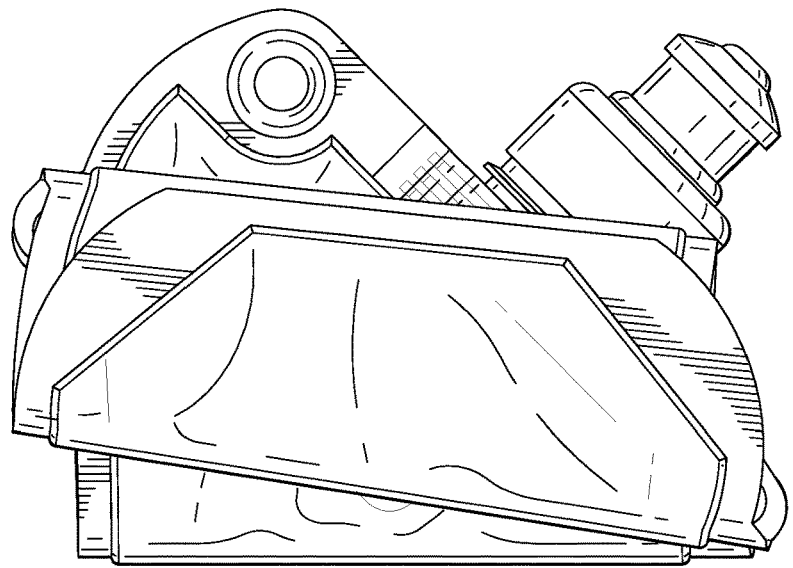
FIG. 24 is a front view of the roll-up bottle of FIG. 23.
Figure 25:
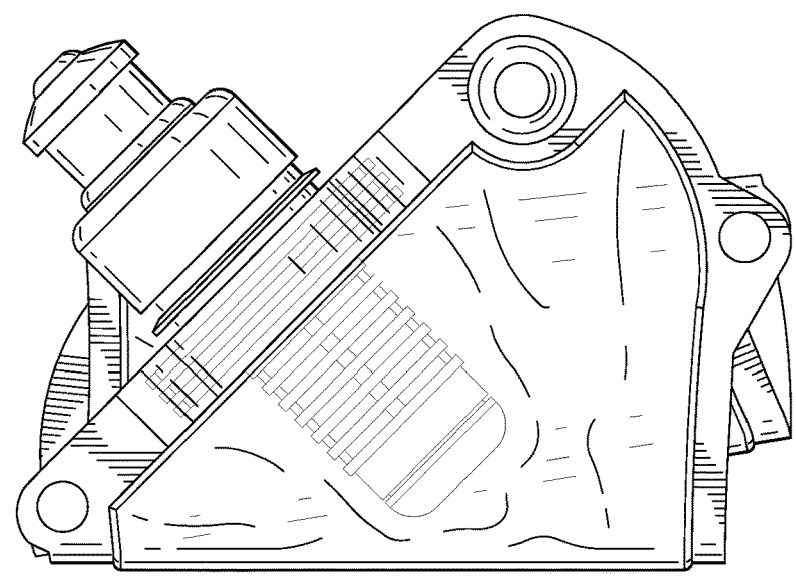
FIG. 25 is a back view of the roll-up bottle of FIG. 23.
Figure 26:
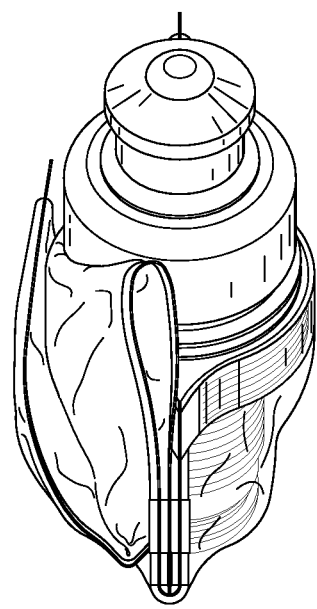
FIG. 26 is a right side view of the roll-up bottle of FIG. 23.
Figure 27:
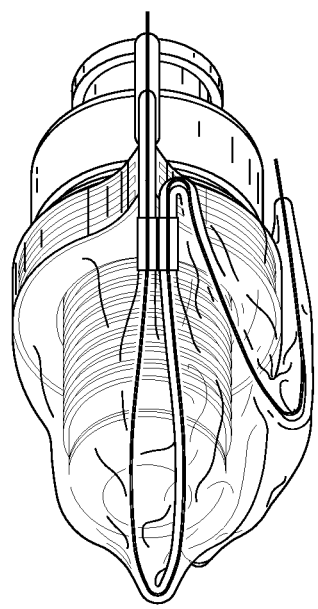
FIG. 27 is a left side view of the roll-up bottle of FIG. 23.
Figure 28:
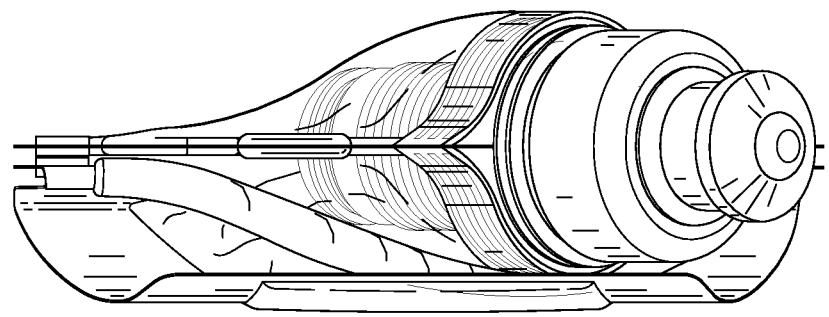
FIG. 28 is a top view of the roll-up bottle of FIG. 23.
Figure 29:
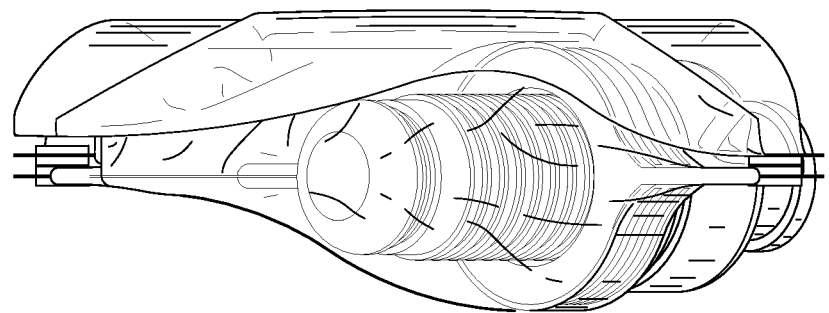
FIG. 29 is a bottom view of the roll-up bottle of FIG. 23.

FIG. 23 is a perspective view of the roll-up bottle 100 according to the second embodiment (having the closure/filter assembly 102) in the full rolled-up configuration. FIGS. 24-29 show the bottle of FIG. 23 in various views. In FIGS. 23-28, a covering cap is removed to illustrate a structural configuration of a conventional pull-top.

Without meant to be limiting, the roll-up bottle 100 as described herein preferably is formed of a plastic material, such as BPA-free polypropylene, polyethylene or polyethylene terephthalate, bioplastics (e.g., PLA), and the like. Without meant to be limiting, the roll-up bottle may be formed to hold various volumes of fluid, such as 8, 16 and 22 ounces. In one preferred configuration, the bottle has an elongated form approximately 250 millimeters in height, and 135 millimeters in width.

Preferably, and as seen in FIG. 1, the roll-up bottle 100 comprises a container formed of a pair of opposed, matching plastic pieces or parts that are molded together using a mold. The pieces are sealed around their outer edges 105 to form a substantially sealed container having a hollow cylindrical-shaped opening 104 adjacent an upper portion 106 thereof. An opposed end forms a sealed bottom 108.

Figure 2:
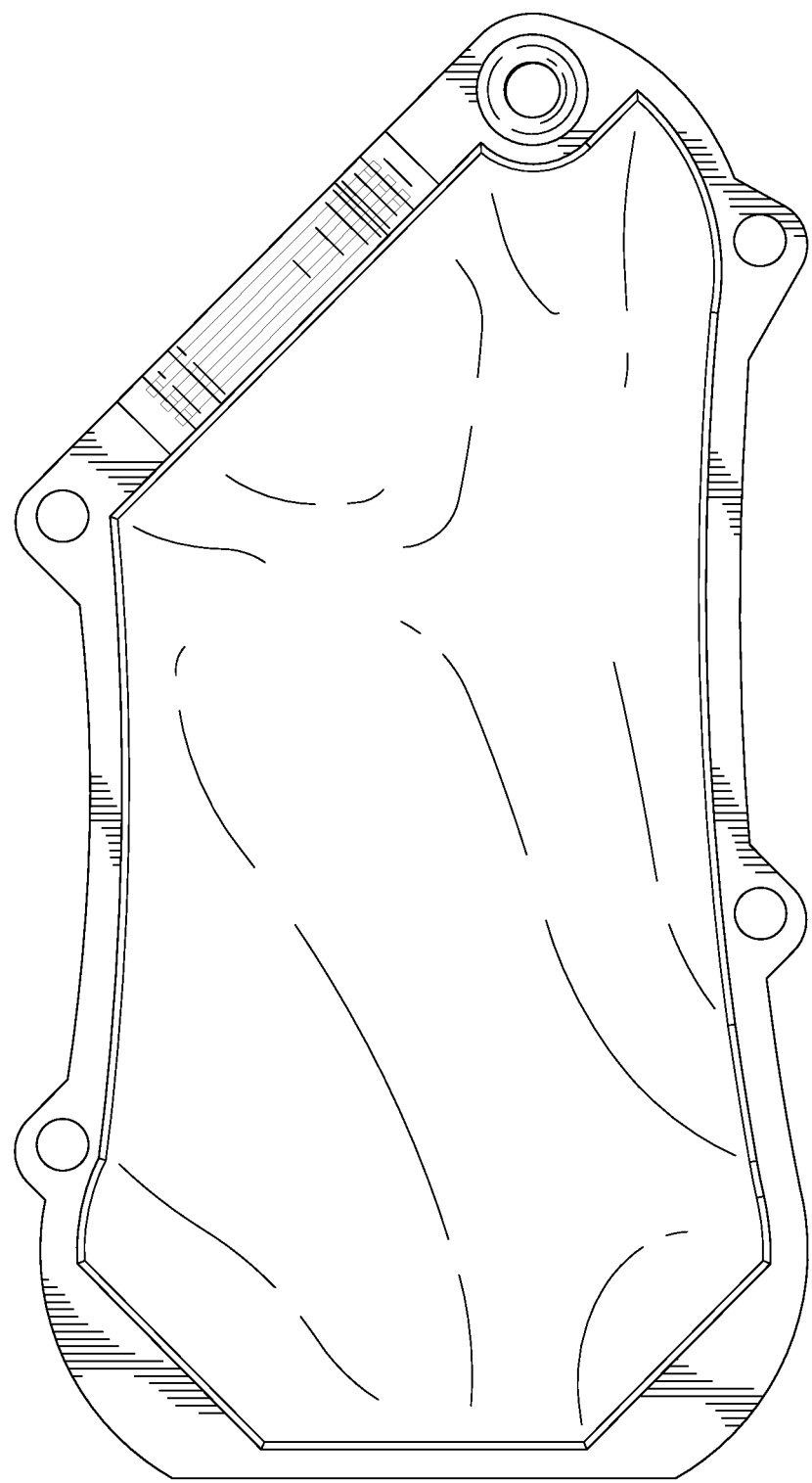
FIG. 2 is a front view of the roll-up bottle of FIG. 1.
Figure 3:
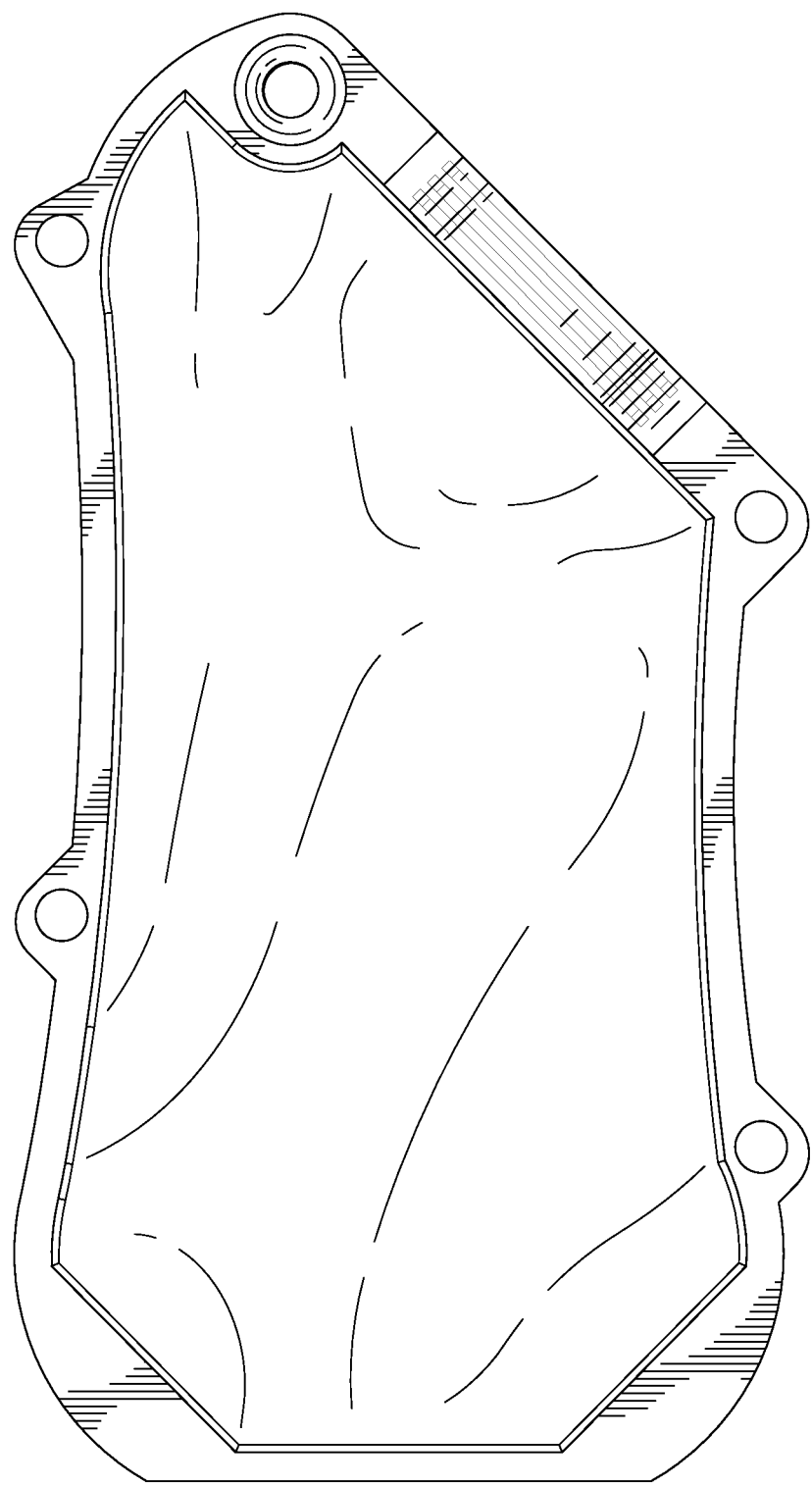
FIG. 3 is a back view of the roll-up bottle of FIG. 1.
Figure 4:
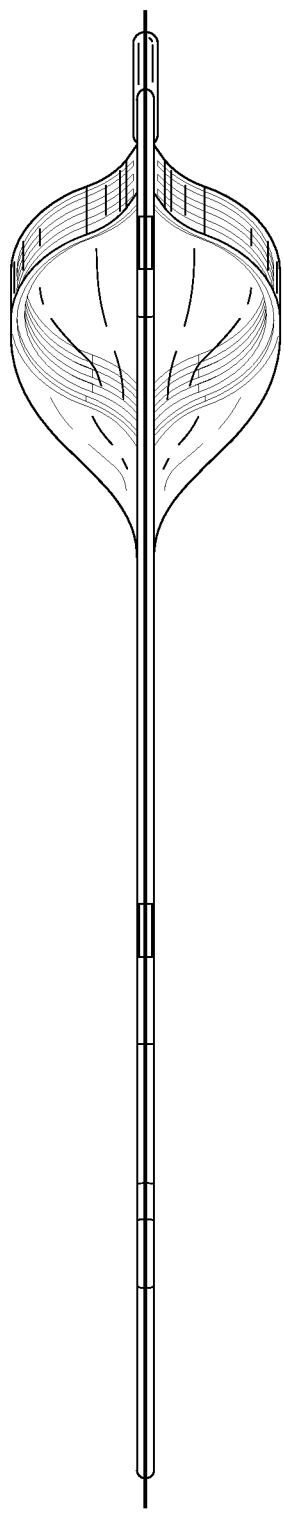
FIG. 4 is a right side view of the roll-up bottle of FIG. 1.
Figure 5:
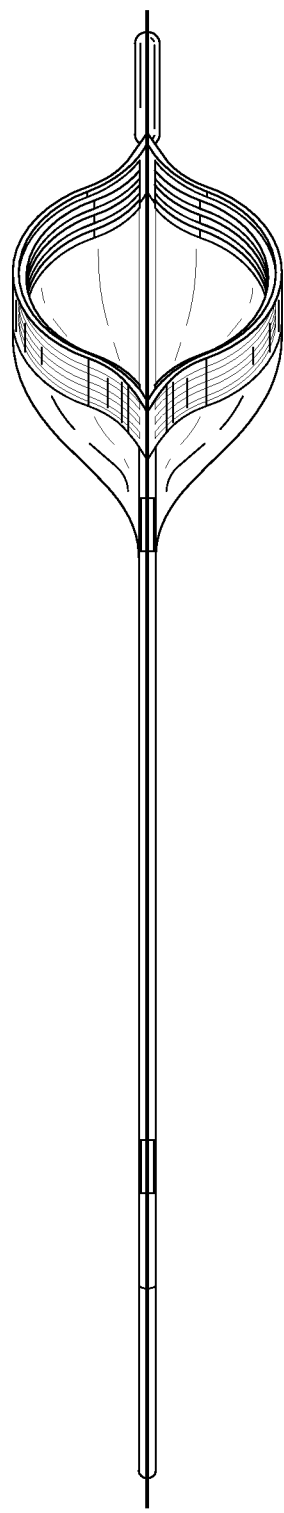
FIG. 5 is a left side view of the roll-up bottle of FIG. 1.
Figure 6:
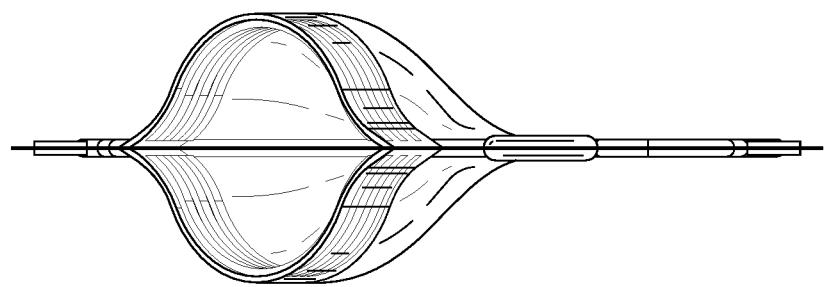
FIG. 6 is a top view of the roll-up bottle of FIG. 1.
Figure 7:
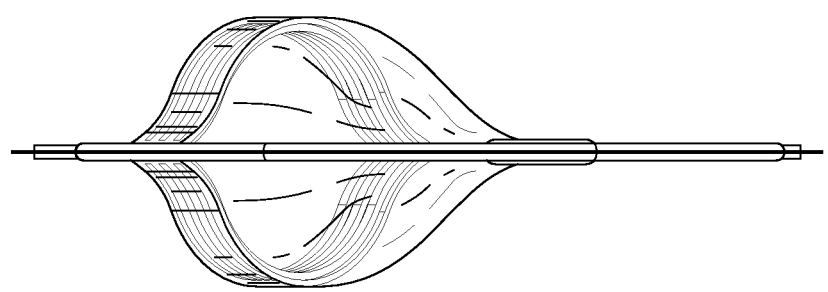
FIG. 7 is a bottom view of the roll-up bottle of FIG. 1.
Figure 30:
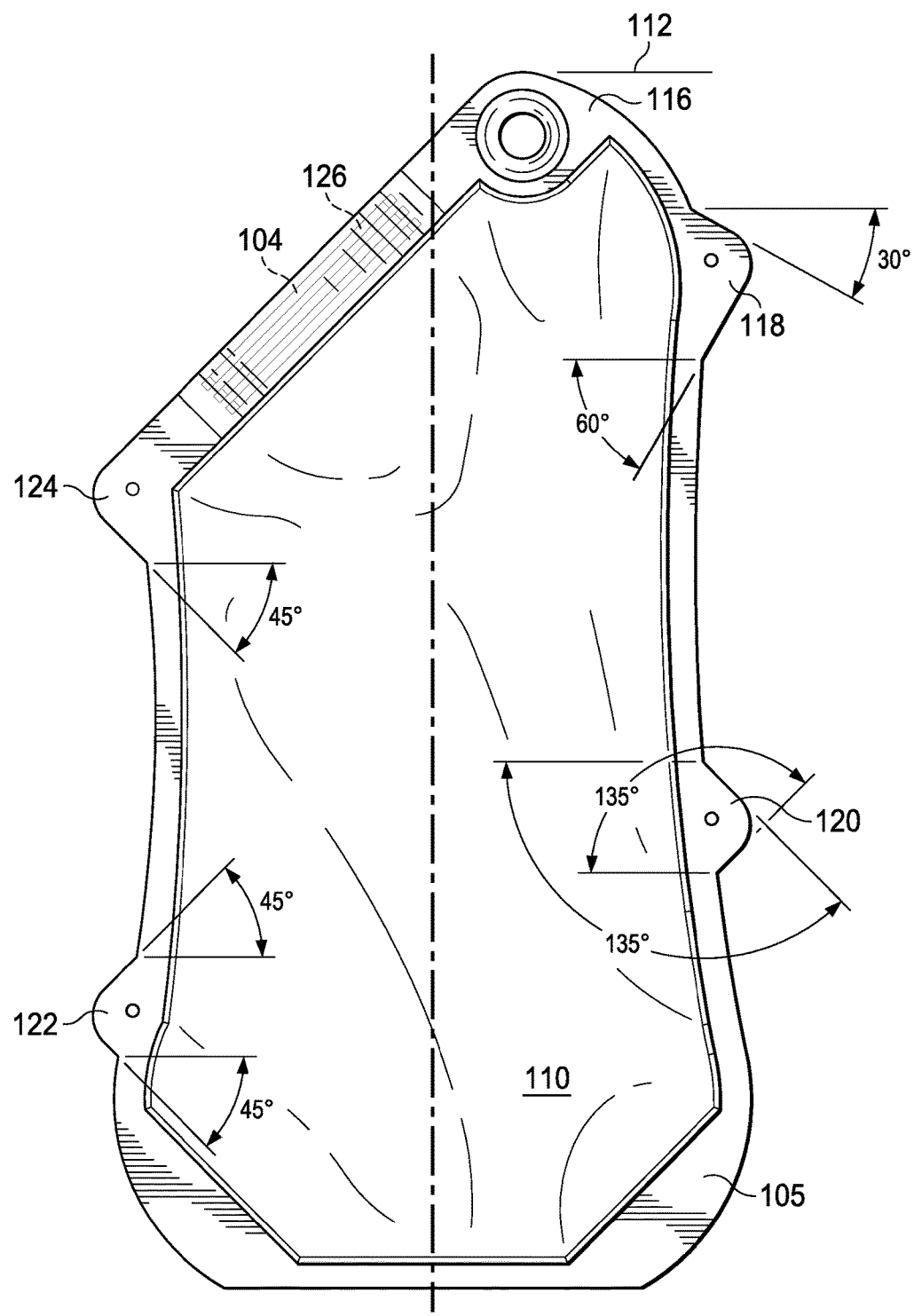
FIG. 30 is a view of the bottle in the orientation shown in FIG. 2 with one opposed piece of the molded container removed and showing further details of a preferred configuration.

FIG. 30 is a view of the bottle in the orientation shown in FIG. 2 showing further details of this configuration. This is open (filled or partially filled) configuration. In this view, one of two of the opposed matching pieces is removed. As can be seen, the remaining piece 110 has an elongated form that resembles a pitcher. The opening 104 adjacent the upper portion is approximately 90 millimeters in length, and it is positioned at an approximate 45° angle relative to a line 112 that bisects a top 114. The edge 105 extends substantially around the entire outer portion of the piece and comprises a top section 116, and first, second, third and fourth outwardly-extending tabs 118, 120, 122 and 124. Top section 116 includes an opening 126 for receiving a clip, such as a carabiner or other such fastener (not shown) for fastening the rolled-up bottle to the user's belt of the like). Each tab supports one element of a fastener, such as a snap fastener with male and female portions. Thus, for example, the snap fastener tabs 119 and 125 are designed to mate with one another, as are tabs 121 and 123. The snap fasteners can be seen in FIG. 9 (in the open configuration), and in FIG. 18 (in the closed or rolled-up configuration). While snap-style fasteners are preferred, this is not a limitation and any style fastener may be used to secure the mating tab portions. As also illustrated in FIG. 30, preferably the tab configurations have particular angular orientations as shown.

Figure 17:
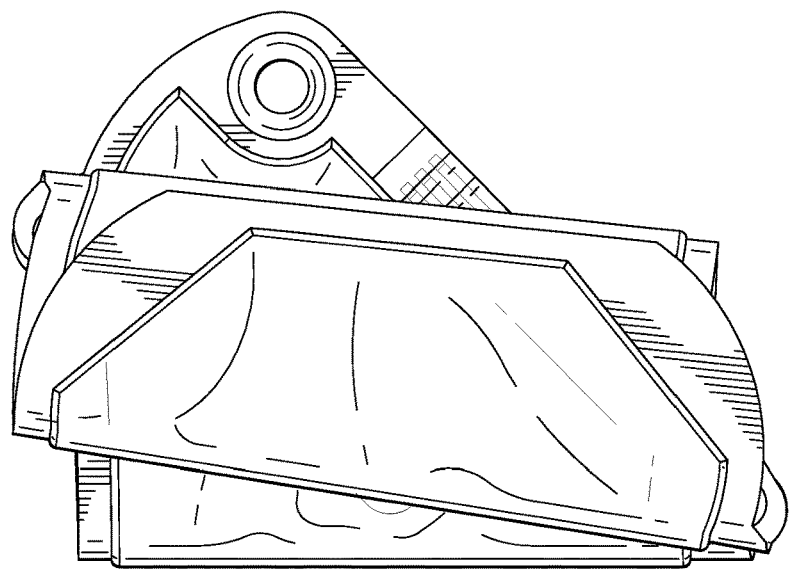
FIG. 17 is a front view of the roll-up bottle of FIG. 16.
Figure 18:
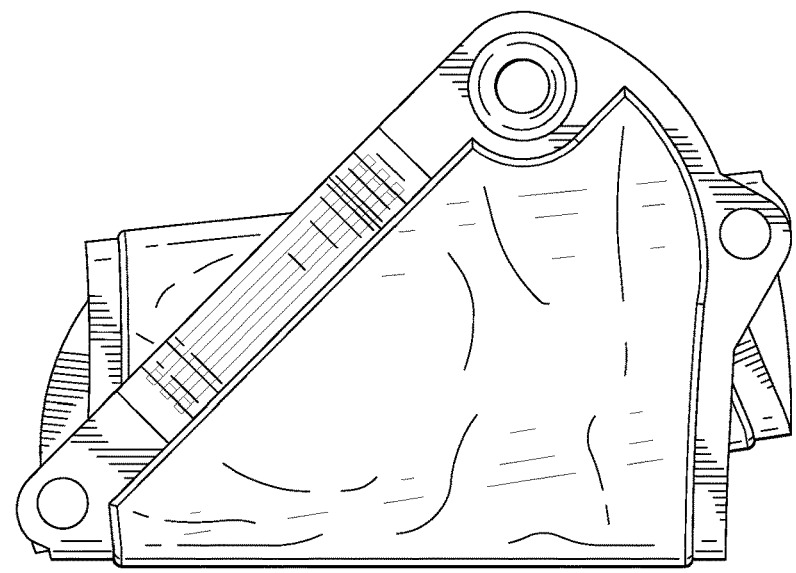
FIG. 18 is a back view of the roll-up bottle of FIG. 16.
Figure 19:
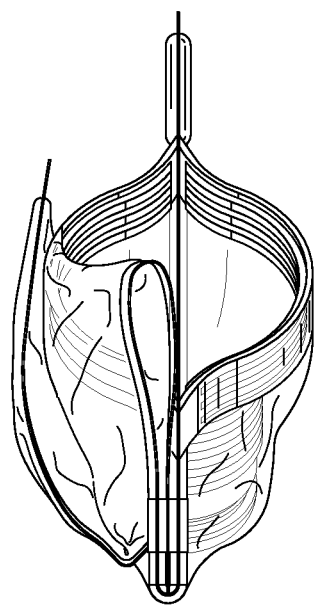
FIG. 19 is a right side view of the roll-up bottle of FIG. 16.
Figure 20:
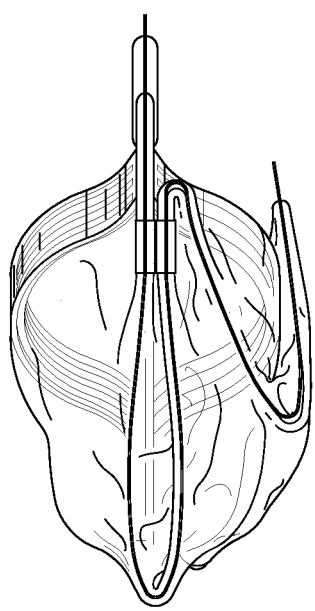
FIG. 20 is a left side view of the roll-up bottle of FIG. 16.
Figure 21:
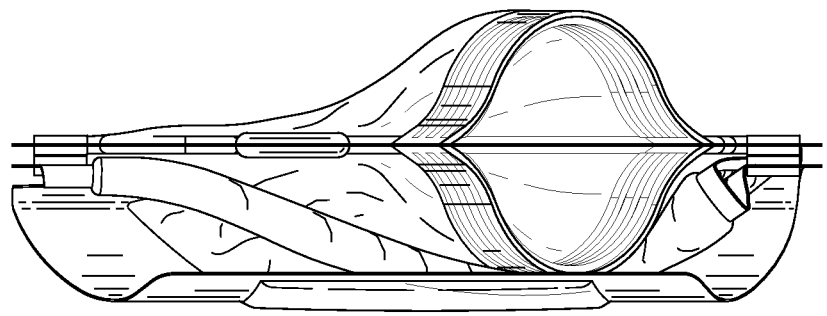
FIG. 21 is a top view of the roll-up bottle of FIG. 16.
Figure 22:
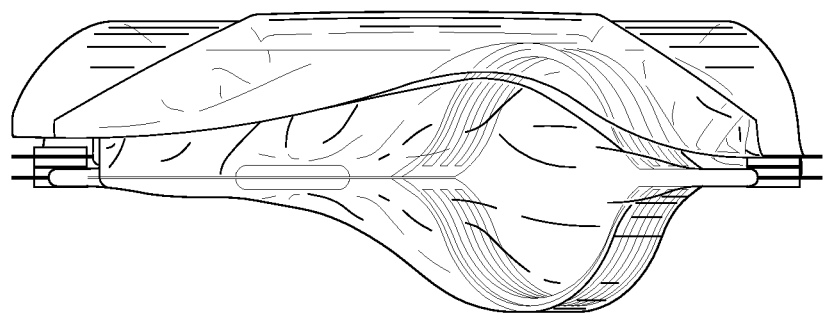
FIG. 22 is a bottom view of the roll-up bottle of FIG. 16.

Thus, the outer edge portion of the bottle retains one or more pairs of opposed button-style fasteners. When the bottle is empty, it may be rolled-up for transport storage such as seen in FIGS. 16-18 (with the filter/closure assembly removed) or as seen in FIGS. 23-26 (with the filter/closure assembly present). The opposed button-style fasteners secure rolled-up tab portions of the container as described.

FIGS. 8-15 also show the closure/filter assembly positioned in the bottle; FIGS. 23-28 shown the closure/filter assembly with the covering cap omitted, as described above.

Figure 31:
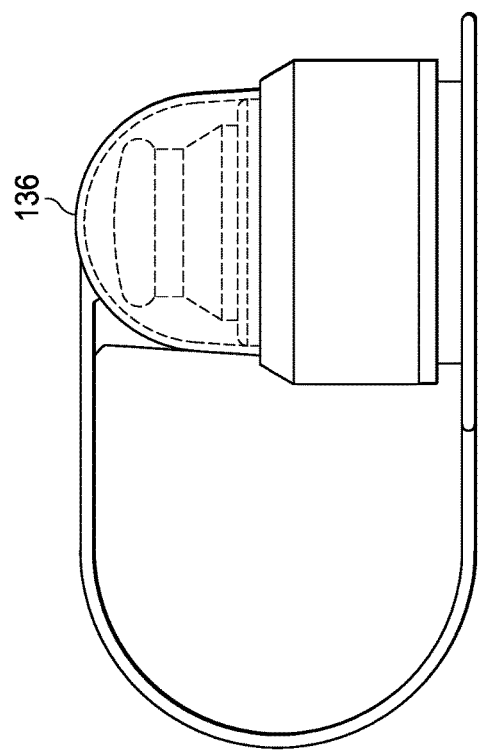
FIG. 31 illustrates components of the closure portion of the closure/filter assembly.
Figure 31:
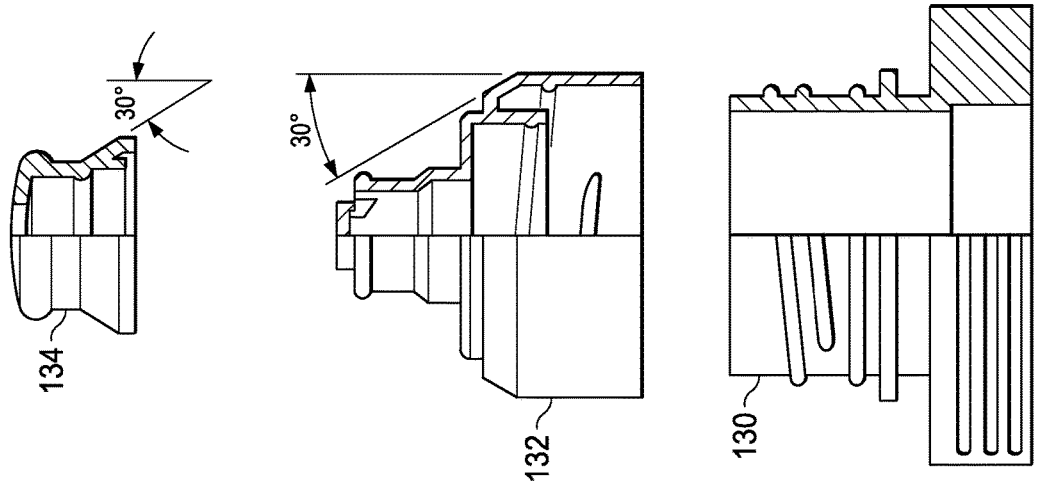

FIG. 31 illustrates the structural details of the closure components of the closure/filter assembly. These components include bottle opening support member 130, bottle cap 132, mouthpiece 134, and an optional protective cap 136. The bottle opening support member 130 is fitted into the hollow cylindrical-shaped opening 104 (see, e.g., FIG. 1) formed when the opposed, matching plastic pieces or parts are molded together. Bottle cap 132 is secured over the bottle opening support member 130, and mouthpiece 134 is fitted into the bottle cap, all in a known manner. FIG. 8 illustrates the protective cap 136 snapped into a closed position to cover the cap and mouthpiece. When the protective cap 136 is opened, the user can open the mouthpiece to access the stored liquid.

Figure 32:
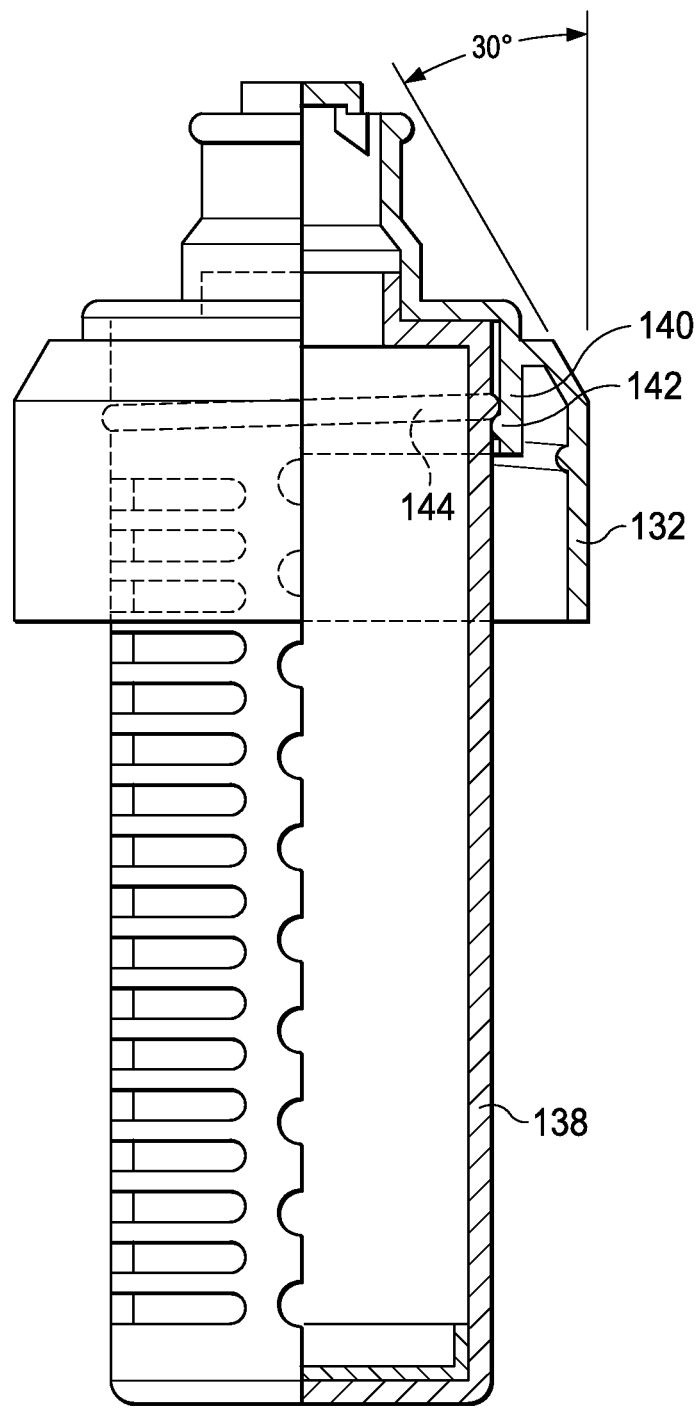
FIG. 32 illustrates a filter supported within the bottle cap.

Preferably, the bottle cap 132 supports a filter (shown in phantom here) 138 as illustrated in FIG. 32. In particular, the bottle cap 132 includes an internal receiving cylinder 140 that includes a retaining flange 142 adapted to receive a corresponding threading 144 in the filter mechanism 138. The filter mechanism is threadably-secured within the bottle cap and removably-retained there.

Figure 33:
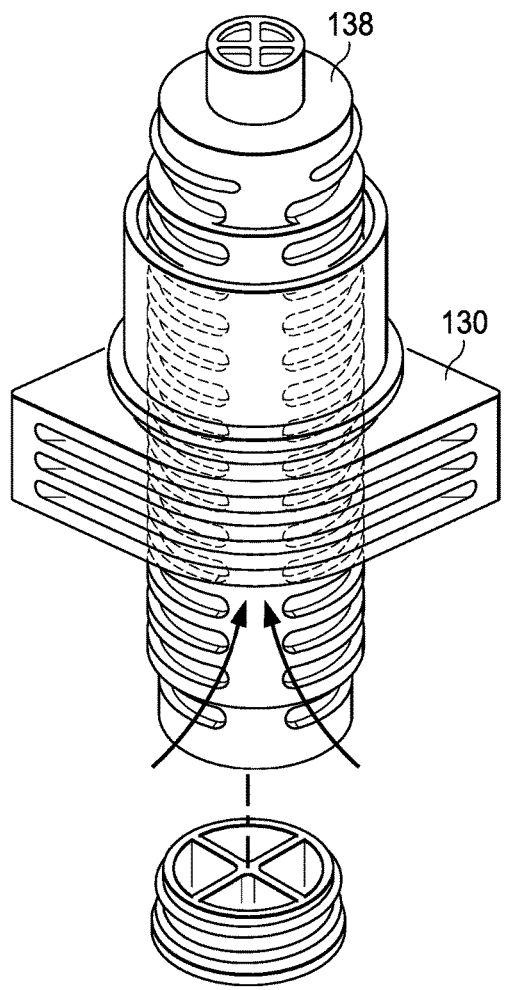
FIG. 33 illustrates a position of the filter relative to the bottle opening support member showing a pair of water flow channels created by the structural arrangement of the closure/filter assembly.
Figure 34:
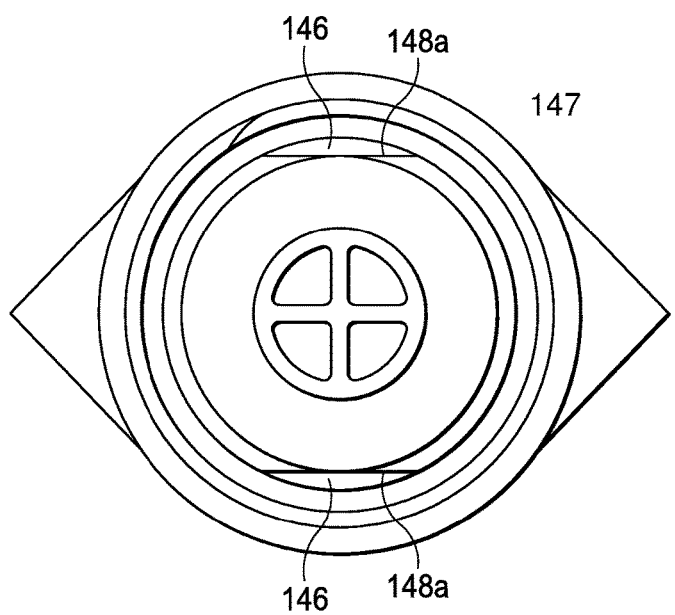
FIG. 34 illustrates a top/plan view of the structural arrangement shown in FIG. 33.

FIG. 33 illustrates the positioning of the filter 138 (shown in phantom, and partially exploded) relative to the bottle opening support member 130, with the bottle cap 132 omitted. FIG. 34 is a plan view illustrating a pair of water flow channels 146 that are present when the filter (as fitted into the bottle cap) is retained within the bottle opening support member 130. This structural arrangement provides significant advantages. In particular, and as will be described below, by creating a profile on the outer wall 147 of the cylinder (of the filter), two flat walled surfaces 148a and 148b on opposing sides of the outer wall of the filter housing are created; the result is a unique contour of the filter housing allowing for the passage of fluid (water in this case) between the channels 146 created between the flat outer wall portion of the filter housing and the round surface of the inner wall of the bottle opening support member. Upon the user applying suction or pressure from squeezing the bottle (or any combination thereof), water contained within the bottle will flow to and through vent openings within unobstructed walls of the filter cage (as will be described below), but also up through the designed channels 146 of the flat portion of the outer walls of the filter housing. The water then spreads out across the vent openings that might otherwise be mostly obstructed in the portion of the filter cage that is in close proximity to the molded bottle opening piece. The result is a more even distribution of fluid across a greater portion of the inner filter's material than if the flat channel structural arrangement were not applied. Because of this improved flow, the filter material can fill the inside of the cage (wall-to-wall).

Figure 35:
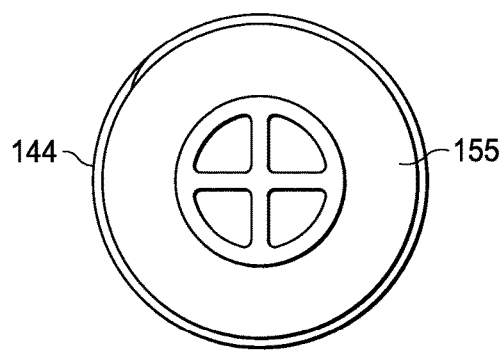
FIG. 35 illustrates the filter, partially cutaway, according to one embodiment.
Figure 35:
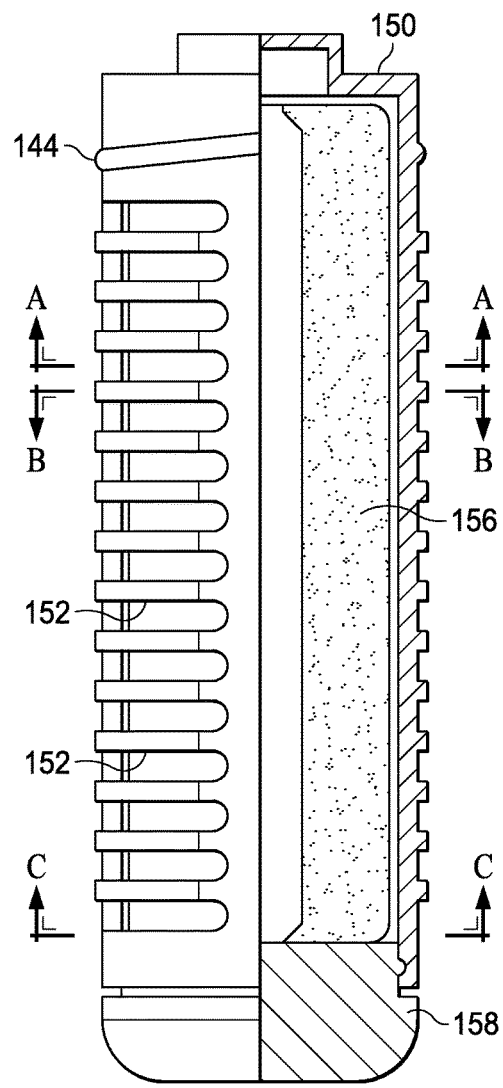
Figure 36:
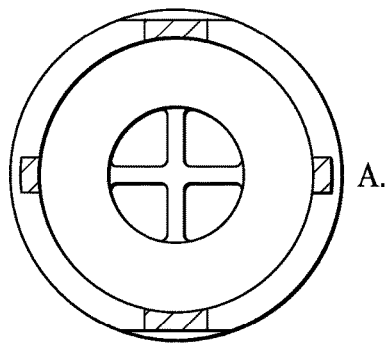
FIG. 36 illustrates the filter along a view of lines A-A in FIG. 35.
Figure 37:
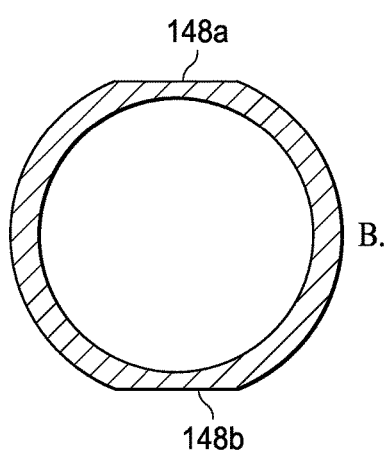
FIG. 37 illustrates the filter along a view of lines B-B in FIG. 35.
Figure 38:
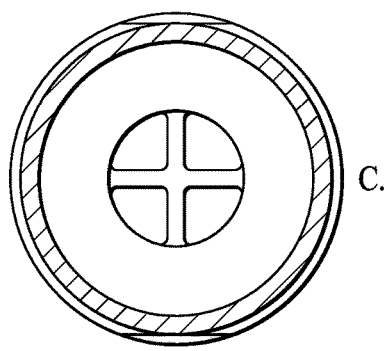
FIG. 38 illustrates the filter along a view of lines C-C in FIG. 35.

FIG. 35 illustrates a view of the filter, partially cutaway, showing a preferred structural configuration. The filter comprises a filter housing 150 with the threading 144 on its upper neck portion. The filter housing includes vents 152 opening into the interior of the housing and through which fluid flows in an out an opening 154 in the top 155 of the housing (shown exploded). Filter material 156 is positioned within the housing, and it is porous or packed in such a manner to allow liquids to pass through the filter while trapping impurities. The filter material may be of varying types. A representative filter material 156 is an activated charcoal suspended in a non-woven mesh. In a variant, the filter material 156 is an activated charcoal suspended in an anti-bacterial, anti-fungal mesh. Other types of filter material(s) may be used. As described, the liquid enters the filter housing through vents (or other similar types of openings) 152 molded in a side wall of the filter housing. The filter material may be accessed (and thus replaced as desired or necessary) by removing the filter from the bottle, and then removing a bottom cap 158. FIGS. 36-38 show various views of the filter housing along lines A-A, B-B and C-C in FIG. 35. FIG. 37 in particular shows the flat walled surfaces 148a and 148b described above and that facilitate the formation of the exterior water flow channels 146. As previously described, by creating a profile on the outer wall of the cylinder that results in surfaces 148a and 148b on the opposing sides of the outer wall of the filter housing, the contour of the filter housing enables passage of fluid between the filter housing, on the one hand, and the round surface of the inner wall of the bottle opening support member, on the other hand. Applied suction/pressure draws water both through the vents 152 of the filter cage, but also up through these channels. As described, the result is a much more even distribution of fluid across a greater portion of the filter material 156.

Although a pair of channels 146 are shown in the above-described embodiment, the structural arrangement may include just one channel, or more than two channels, depending on the outer profile of the outer wall of the otherwise generally cylindrical) filter housing.

Without meant to be limiting, the molded portion of the bottle may be formed of different colored material. The outer surfaces of one or more of the pieces may include other indicia or graphics.

Having described my invention, what I now claim is as follows:

1. A roll-up bottle system, comprising:
    a body forming a substantially sealed container having a hollow cylindrical opening adjacent one end thereof, and an opposed end forming a bottom, the body comprising a pair of opposed matching pieces, the opposed, matching pieces being sealed about their edges to form the substantially sealed container, wherein each of the opposed matching pieces includes an edge extending substantially around an entire outer portion thereof, at least first and second pairs of outwardly-extending tabs positioned along the edge relative to each other and supporting first and second pairs of fastener elements, the first and second pairs of fastener elements adapted to mate with one another and maintain the body in a first rolled-up configuration; and
    a removable closure and filter assembly received and supported in the hollow cylindrical opening, the removable closure and filter assembly having a filter portion being substantially within the body when the body is in a second unrolled configuration, the removable closure and filter assembly comprising a bottle opening support member received in the hollow cylindrical opening in the body and having an inner cylindrical wall, a bottle cap, and a filter, the filter being removably-retained with the bottle cap, the filter having a generally cylindrical outer wall with a first flat walled surface and an opposed second flat walled surface along a portion thereof, the first flat walled surface and its opposed second flat walled surface in association with the inner cylindrical wall of the bottle opening support member forming a first water flow channel and a second water flow channel when the closure and filter assembly is received and supported in the body.

2. The roll-up bottle system as described in claim 1 wherein the body is formed of a plastic material.

3. The roll-up bottle system as described in claim 2 wherein the plastic material is one of: BPA-free polypropylene, polyethylene or polyethylene terephthalate, and a bioplastic.

4. The roll-up bottle system as described in claim 1 wherein the filter includes a filter material.

5. The roll-up bottle system as described in claim 4 wherein the filter material is an activated charcoal suspended in a non-woven mesh.

6. The roll-up bottle system as described in claim 4 wherein the filter material is suspended in an anti-bacterial, anti-fungal mesh.

7. The roll-up bottle system as described in claim 1 wherein the filter includes a housing that includes a plurality of vents.

\* \* \* \* \*